F. F. WHITE.
Harvester.
No. 163,123. Patented May 11, 1875.
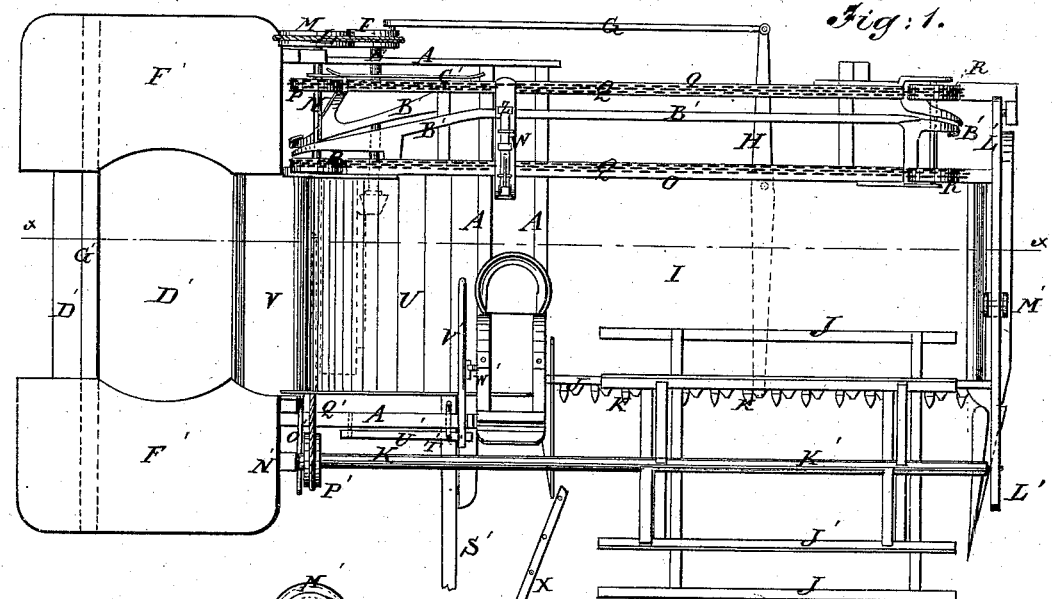
Fig: 1.
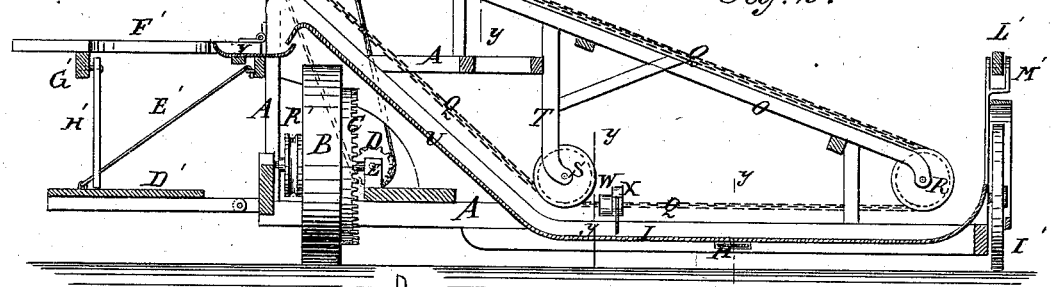
Fig: 2.
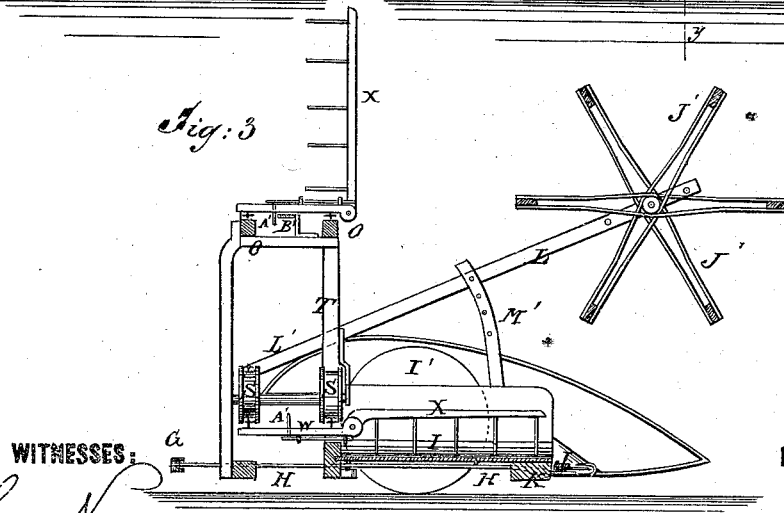
Fig: 3.
Fig: 4.
WITNESSES:
Chas. Nida
A. F. Terry
INVENTOR:
Frederic F. White
BY
ATTORNEYS.

UNITED STATES PATENT OFFICE.

FREDERIC F. WHITE, OF STACYVILLE, IOWA.

IMPROVEMENT IN HARVESTERS.

Specification forming part of Letters Patent No. 163,123, dated May 11, 1875; application filed September 26, 1874.

*To all whom it may concern:*

Be it known that I, FREDERIC F. WHITE, of Stacyville, in the county of Mitchell and State of Iowa, have invented a new and useful Improvement in Harvester, of which the following is a specification:

Figure 1 is a top view of my improved harvester. Fig. 2 is a vertical longitudinal section of the same, taken through the line $x$ $x$, Fig. 1. Fig. 3 is a detail cross-section of the same, taken through the line $y\,y\,y\,y\,y\,y$, Fig. 2. Fig. 4 is a detail side view of one of the rakes.

Similar letters of reference indicate corresponding parts.

The invention will first be fully described, and then pointed out in the claim.

A represents the frame-work of a harvester. B represents the drive-wheels, the journals of which revolve in bearings attached to the frame A. To the side of the drive-wheel B is attached a gear-wheel, C, into the teeth of which mesh the teeth of a small gear-wheel, D, attached to the shaft E, the journals of which revolve in bearings attached to the frame-work A. To the rear end of the shaft E is attached a crank or crank-wheel, F, to the crank-pin of which is pivoted one end of a connecting-rod, G, the other end of which is pivoted to the rear end of the bar H, which is pivoted to the under side of the rear part of the platform I, and the forward end of which is pivoted to the cutter-bar J, which works upon the finger-bar K, with which the forward edge of the platform I is connected. This construction enables the cutters to be adjusted to cut the grain close to the ground when said grain is short or has fallen down. To the shaft E is attached a chain-wheel, which may be the crank-wheel F, and around which passes an endless chain, L. The chain L also passes around a chain-wheel, M, attached to the rear end of a short shaft, N, that revolves in bearings attached to the upper ends of two inclined bars, O, placed above the rear part of the platform I, and connected with and supported from the frame-work of the machine. To the shaft N, and in line with the inclined bars O, are attached two chain-wheels, P, around which pass two endless chains, Q, which pass down along the upper sides of the inclined bars O, around chain wheels or pulleys R, pivoted at the lower ends of the inclined bars O, and around chain wheels or pulleys S, pivoted to hangers T, connected with and supported from the inclined bars O and the frame-work of the machine. The part of the endless chains Q between the chain wheels or pulleys R and S is parallel with and just above the rear part of the platform I. The part of the endless chains Q between the chain-wheels S and P is parallel with and just above the rear part of the inclined apron U, that extends from the inner end of the platform I to the trough or receiver V, which receives the bunches or gavels of grain from the rakes, and from which they are taken by the binders. To the endless chains Q, at suitable distances apart, are attached cross-bars W, to the inner ends of which are pivoted the ends of the rakes X. To the pivoted ends of the rakes X are rigidly attached small gear-wheels Y, into the teeth of which mesh the teeth of the rack-bars Z, which slide in keepers attached to the outer sides of the cross-bars W, and to the outer ends of which are attached, or upon them are formed, arms or pins A', which project through longitudinal slots in the said cross-bars W, as shown in Figs. 3 and 4. By this construction, as the rack-bars Z are moved rearward the rakes X will be raised into a position at right angles with the cross bars W, and as the rack-bars Z are moved forward the rakes X will be lowered into line with the cross bars W. The rakes X are lowered at the proper time to sweep the grain from the platform I, up the inclined apron U, and into the receiver V, and raised and held up while moving back to the outer end of the platform I by guides B', attached to the inclined bars O, or to cross-bars attached to said inclined bars. The endless chains Q are kept from yielding to the outward pressure of the cross-bars W while the rakes are being raised by a guard or stop-plate, C', attached to the rear inclined bar O. D' is the platform upon which the binders stand, the inner part of which is hinged to the lower part of the frame A, and its outer part is supported by hooks E' hooking into eyes or staples attached to the upper part of the said frame A. F' are the tables upon which the gavels are laid to be bound, and the outer parts of which are connected by a bar, G', to strengthen them, and to serve as a guard to prevent the binders from falling from the platform D'. The inner parts of the tables F' are hinged to the upper part of the frame A, and their outer parts are supported by pivoted legs H', which rest upon the platform D', and which, when the tables F' are raised into a vertical position, may be turned parallel with said tables, so as to be out of the way. By this construction the binders' platform D' and tables F', when not in use, may be turned up into a vertical position, and secured by buttons or hooks for convenience in passing from place to place. The outer end of the platform I is supported by a small wheel, I'. J' is the reel, the outer end of the shaft K' of which revolves in a hole in the bar L', several holes being formed in the said bar to receive the said shaft, so that the reel may be adjusted forward or back, as may be desired. The rear end of the bar L' is pivoted to a support attached to the rear outer corner of the platform I. The middle part of the bar L' passes through a slotted arm, M, attached to the outer end of the platform-frame, where it is supported by a pin passed through one or the other of the holes formed in the said arm M', so that the reel can be readily adjusted higher or lower, as may be desired. The inner end of the reel-shaft K' revolves in one of the holes in the arm or bar N', so that it can be easily raised and lowered, as required. The lower end of the arm N' is pivoted to the frame A, and the said arm is secured in place by a brace-arm, O', one end of which is pivoted to the frame A, and its other end is connected with the pivoted arm N' by a pin. Several holes are formed in the brace O' to receive the said pin, so that the reel may be adjusted forward or rearward, as may be desired. To the inner end of the reel-shaft K' is attached a chain-wheel, P', around which passes an endless chain, Q', which also passes around a chain-wheel, R', rigidly connected with the drive-wheel B, so that the reel may be driven by the advance of the machine. S' is the tongue, which is pivoted, near its rear end, to the forward part of the frame A, and to which, a little in the rear of its pivot, is pivoted the lower end of a rod, T', the upper end of which is pivoted to a lever, U'. One end of the lever U' is pivoted to the upper part of the frame A, and to its other end is pivoted the forward end of the lever V'. The lever V' is pivoted to the frame A, or to a support attached to said frame, and its rear end projects back into such a position that it may be conveniently reached and operated by the driver from his seat, so that the forward side of the machine can be conveniently raised and lowered to cut the grain at any desired distance from the ground. The lever V' is held in any position into which it may be adjusted by a toothed bar, W', attached to the frame A, and across which the said lever passes.

Having thus described my invention, what I claim as new, and desire to secure by Letters Patent, is—

The combination of the gear-wheel Y, the toothed bar Z, the pin A', and the guides B' with the rake X, the cross-bar W, the endless chains Q Q, and the inclined bars O O, substantially as herein shown and described.

FREDERIC F. WHITE.

Witnesses:
W. A. WHITE,
F. ADDINGTON.